United States Patent Office 3,234,293
Patented Feb. 8, 1966

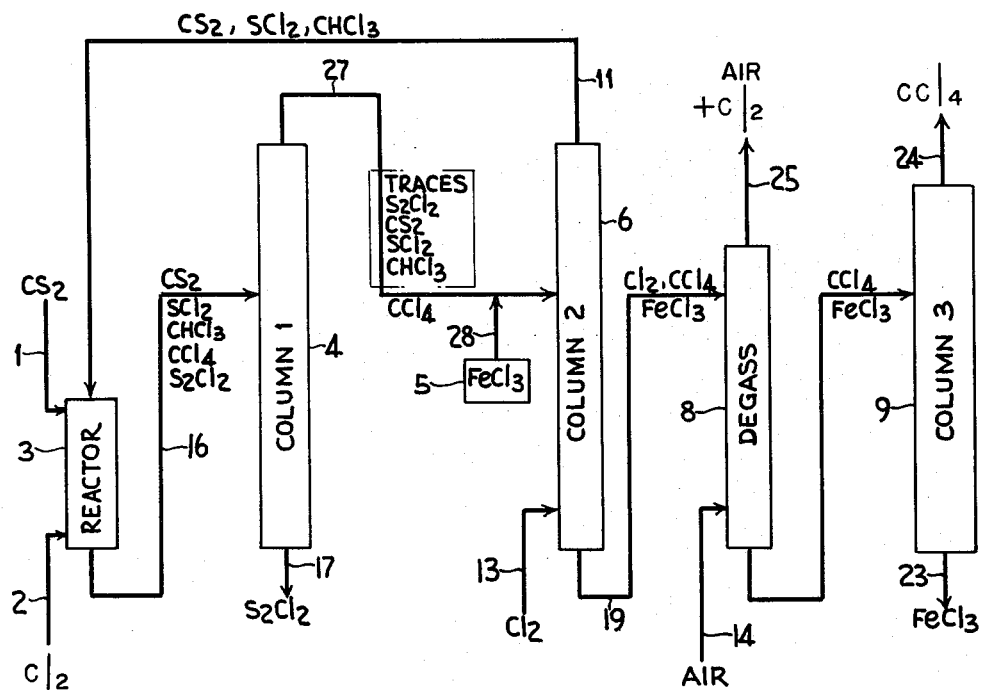

3,234,293
RECOVERY OF HIGH PURITY CARBON TETRACHLORIDE
Frederick C. Dehn and Joe Y. Keller, New Martinsville, W. Va., assignors to Pittsburgh Plate Glass Company, Pittsburgh, Pa., a corporation of Pennsylvania
Filed June 5, 1962, Ser. No. 200,251
7 Claims. (Cl. 260—652)

The present invention relates to the production of carbon tetrachloride. More particularly, the present invention relates to the recovery of high purity carbon tetrachloride from carbon tetrachloride product streams contaminated with sulfur compounds such as sulfur monochloride, sulfur dichloride and sulfur tetrachloride.

One of the methods for producing carbon tetrachloride commercially involves the chlorination of carbon disulfide. The chemical reaction involved in this process may be conveniently illustrated by the following equation:

$$CS_2 + 3Cl_2 \rightarrow CCl_4 + S_2Cl_2$$

This method of preparing carbon tetrachloride by the carbon disulfide route is shown in U.S. Patent 1,697,483 granted January 1, 1962.

Unfortunately, in the production of carbon tetrachloride by the carbon disulfide route, the carbon tetrachloride produced is normally contaminated by the formation of sulfur monochloride and sulfur dichloride by-products. Many specifications for carbon tetrachloride are extremely rigid with respect to permissible sulfur contamination. Thus, for example, in order to produce carbon tetrachloride of Freon grade purity, the level of sulfur compound contamination in carbon tetrachloride must be held to a maximum of about 50 parts per million or 0.005 percent. In providing carbon tetrachloride of this purity, it is common practice in the industry to pass contaminated carbon tetrachloride into a first distillation zone and treat the overhead product of the first distillation zone with a sodium hydroxide solution. The resulting mixture is then distilled in another column to recover pure carbon tetrachloride. Unfortunately, operations of this character introduce water into a chloro-organic system which is undesirable from an economic and engineering standpoint since corrosion problems are considerably magnified by the introduction of such water and the utilization of corrosion resistant equipment and/or drying equipment is necessitated after the hydroxide scrubbing operation.

In accordance with the present invention, a process is provided for recovering carbon tetrachloride substantially free of sulfur compounds from carbon tetrachloride mixtures contaminated principally with sulfur monochloride and sulfur dichloride. The process of the instant invention is conducted under essentially anhydrous conditions and the serious corrosion problems involving practices where wet neutralization systems are employed are thereby avoided. The need for drying equipment is also obviated and, in addition, a carbon tetrachloride product of high purity is readily obtained.

Thus, in accordance with the present invention, carbon tetrachloride of high purity is readily obtained by distilling carbon tetrachloride having contaminating quantities of sulfur monochloride and sulfur dichloride present therein in the presence of gaseous chlorine and a chlorination catalyst. During the distillation, the distillation zone is operated at a temperature favoring the disproportionation of sulfur monochloride to sulfur dichloride and atomic sulfur. The disproportionation of sulfur monochloride takes place in accordance with the following equation:

$$S_2Cl_2 \rightarrow SCl_2 + S$$

In conducting the process in accordance with this invention, gaseous chlorine is supplied during the disproportionation to convert the sulfur formed by the disproporionation of the sulfur monochloride present in the carbon tetrachloride to sulfur dichloride. This chlorination reaction takes place rapidly and with relative ease. In addition, the presence of gaseous chlorine will cause a reaction to take place between the chlorine and sulfur monochloride to produce sulfur dichloride in accordance with the following equation:

$$S_2Cl_2 + Cl_2 \rightleftharpoons 2SCl_2$$

The carbon tetrachloride mixture after or during the introduction of the chlorine is distilled and the sulfur dichloride removed as overhead. After removal of the sulfur dichloride, high purity carbon tetrachloride is readily obtained by recourse to a simple distillation step.

The disproportionation of sulfur monochloride to sulfur dichloride and sulfur takes place typically at low temperatures. When present in a carbon tetrachloride liquid body containing predominant quantities of carbon tetrachloride (90 percent or more), the reaction occurs usually at temperatures below 76° C. Under these conditions, temperatures exceeding 76° C. favor reversing the reaction in the opposite direction so that sulfur dichloride and sulfur formed by disproportionation are reapportioned to form sulfur monochloride. Thus, by carefully controlling the temperature of the initial distillation to provide for a sulfur dichloride-sulfur product mixture from the sulfur monochloride contained in the carbon tetrachloride and supplying sufficient chlorine and a chlorination catalyst to assist in the chlorination of the free sulfur to sulfur dichloride, essentially all sulfur impurities contained in the contaminated carbon tetrachloride mixture are converted to sulfur dichloride. Once this conversion has taken place, sulfur dichloride may be easily separated from carbon tetrachloride by recourse to a standard distillation procedure. Thus, sulfur dichloride is removed as overhead product and the bottoms of this distillation contains essentially pure carbon tetrachloride. Since a chlorination catalyst is preferably employed during the initial distillation, recouse to a second distillation is usually had to provide a catalyst containing bottoms and essentially pure carbon tetrachloride is recovered as overhead. Typical of the catalysts which may be employed are: $FeCl_3$, $AlCl_3$, $SnCl_4$, $NiCl_2$, $CoCl_3$, $TiCl_4$, $CoPtCl_6$, $CoSnCl_6$.

For a more complete understanding of the present invention, reference is made to the accompanying drawing, which is a diagrammatic illustration of one mode of conducting the process of the present invention to provide substantially pure carbon tetrachloride from a carbon tetrachloride mixture contaminated by sulfur chloride (sulfur monochloride-sulfur dichloride).

As shown in the drawing, carbon disulfide is passed through line 1 to reactor 3. Gaseous chlorine is admitted to the reactor 3 through line 2. The products of the reaction, sulfur dichloride, sulfur monochloride, carbon tetrachloride and unreacted carbon disulfide, are removed from the bottom of the reactor and introduced through line 16 into a distillation column 4. In distillation column 4, temperature and pressure are regulated so that carbon tetrachloride is removed overhead through line 27. Traces of sulfur monochloride, carbon disulfide, sulfur dichloride and some chloroform are typically found in the carbon tetrachloride overhead. The bottoms from column 4 contains much of the sulfur monochloride present in the feed to that column and is discarded after removal through line 17.

The overhead from column 4 is fed to a combination chlorinator and distillation column 6. Prior to its introduction into column 6, the feed stream to the column has ferric chloride admitted thereto through line 28. Chlorine is fed to the bottom of column 6 through line 13. This column is operated at temperatures and pressures such that a carbon tetrachloride bottoms is obtained. The overhead of the column is mainly composed of unreacted carbon disulfide, sulfur dichloride and chloroform and is removed through line 11 and returned to reactor 3. The bottoms, which is composed of carbon tetrachloride, chlorine and ferric chloride, is then transferred to a de-gassing column 8. In this column, the liquid carbon tetrachloride is contacted with a purge gas such as nitrogen or air, which gas is admitted to the column through line 14. The purge gas and excess chlorine are removed overhead through line 25. The de-gassed or purged carbon tetrachloride containing ferric chloride is then introduced into a fractionation column 9 via line 21 where essentially pure 99.99 percent carbon tetrachloride is obtained as overhead through line 24 and ferric chloride is removed from the column through line 23.

As can be readily seen from the above description, a unitary process by virtue of the present invention is thereby provided which results in the obtainment of essentially pure 99.99 percent carbon tetrachloride from carbon tetrachloride which is contaminated with sulfur dichloride and sulfur monochloride. In conducting the process of the present invention, the important consideration is the maintenance in the chlorination zone of conditions which will give rise to the disproportionation of the sulfur monochloride contained in the carbon tetrachloride product to thereby provide essentially a sulfur dichloride contaminant rather than the monochloride contaminant. As previously stated, sulfur monochloride will disproportionate to sulfur dichloride and sulfur in accordance with the equation $S_2Cl_2 \rightleftharpoons Cl_2 + S$. This reaction is a reversible reaction and it is, therefore, essential in conducting the process in accordance with this invention that the chlorination taking place in the chlorinator 6 be maintained such that all sulfur liberated during the disproportionation of the sulfur monochloride present in the carbon tetrachloride fed to said zone is chlorinated to sulfur dichloride.

Since the maintenance of low temperatures is required for the effective disproportionation of sulfur monochloride to the dichloride because of the tendency of the reversible reaction to favor the sulfur monochloride state in the presence of considerable quantities of heat, a preferred embodiment of the present invention utilizes ultraviolet radiation in the chlorinating zone to assist in the disproportionation. By recourse to an electro-magnetic radiation of this type, low temperatures are easily maintained and the disproportionation takes place in satisfactory fashion keeping the reaction going to the right so long as sufficient chlorine is supplied during the disproportionation to accomplish the effective chlorination of the released sulfur.

As previously stated, the reaction of the carbon disulfide with chlorine may be conducted in reactor 3 in any convenient manner. Thus, for example, the process of U.S. Patent 1,697,483 may be employed where the carbon disulfide is contacted with chlorine in the presence of powdered antimony or iron catalysts to produce carbon tetrachloride. This reaction is well known in the prior art and the utilization of prior art techniques to effect the formation of carbon tetrachloride and sulfur dichloride products are well known.

In the first distillation of the carbon tetrachloride-sulfur dichloride-sulfur monochloride mixture, temperature and pressure conditions are such that the column under atmospheric conditions of pressure operates at a temperature of below 59° C. Operating this first distillation column in this manner, essentially the predominant proportion of sulfur dichloride contained in the mixture passed from the reactor 3 and is removed from the system.

While in the drawing ferric chloride is shown admitted to the carbon tetrachloride-sulfur monochloride stream prior to its introduction into the chlorinating zone, this, of course, is a matter of choice and is not critical to the process. Thus, if desired, while in the drawing a continuous process is illustrated it is, of course, feasible to conduct batch distillations of the carbon tetrachloride-sulfur monochloride mixture in which case ferric chloride would be admitted to the still pot of the column 6 and chlorine would be admitted during the distillation to provide for chlorination of any sulfur to sulfur dichloride.

The quantity of ferric chloride employed in the distillation column is typically about 0.1 percent by weight of the charged distillation column; and, of course, in operation of a continuous process sufficient ferric chloride will be added to maintain at least 0.05 percent ferric chloride in the still pot of the distillation column.

The exact quantity of chlorine added to the reboiler during the distillation or admitted to the still pot during a batch distillation will depend in great measure on the quantity of impurity present in the charge. Thus, as has been previously shown by the disproportionation equation, taking into consideration the quantity of sulfur dichloride present, sufficient chlorine is added to supply two chlorine atoms for every sulfur atom released during the disproportionation reaction. Thus, by periodically analyzing the carbon tetrachloride charge to the distillation system for its sulfur monochloride content, sufficient chlorine is added to satisfy the requirements of the disproportionation reaction for converting the released sulfur to sulfur dichloride. As a preferred method of operation, a slight excess of chlorine is typically employed over and above the amount required to satisfy the chlorine requirements for released sulfur during the disproportionation reaction.

In the operation of the chlorinator 6, it is not necessary as an absolute requirement that radiation of the charge be conducted in order to disproportionate the sulfur monochloride to sulfur dichloride and sulfur. Thus, while it is preferred that electro-magnetic radiation, such as ultraviolet radiation, be employed to accomplish this disproportionation in a satisfactory manner, it may be done without recourse to electro-magnetic irradiations if desired.

For a more complete understanding of the present invention, reference is made to the following example, which is illustrative of a method of providing a C.P. grade carbon tetrachloride from a contaminated carbon tetrachloride having sulfur dichloride and sulfur monochloride present therein.

*Example*

A 50 plate glass column, having a reflux ratio of 15 to 1, was utilized to distill a charge of 1,960.0 grams of carbon tetrachloride containing 40 grams of sulfur monochloride. The reboiler used in the column was a two liter glass flask having inserted therein an ultraviolet fluorescent tube of 15 watt capacity. A fritted glass disperser was located in the bottom of the flask and connected to a glass tube through which chlorine was admitted to the flask during the distillation operation. Utilizing this equipment on the above charge, the light was started and heat was applied to the reboiler. A 2 gram charge of ferric chloide amounting to 0.1 percent by weight of the charge was added to the flask just prior to the admission of heat thereto. The column was operated under atmospheric conditions of pressure and had an overhead temperature of 59° C. until 7.69 percent of the charge was distilled off. After 7.69 percent of the charge was distilled off, no sulfur was found in the analyses of the overhead and the chlorine admission to the flask was then stopped. Upon completion of the removal of the remainder of material, the carbon tetrachloride was examined for sulfur and the sulfur content was found to be below 0.01 percent by weight.

While the invention has been described with reference to a certain specific example and an illustrative embodiment, it is, of course, to be understood that the invention

We claim:

1. A process for purifying a carbon tetrachloride liquid body containing at least 90 percent carbon tetrachloride and contaminating quantities of sulfur dichloride and sulfur monochloride comprising introducing a metal chloride chlorination catalyst to said contaminated carbon tetrachloride liquid body, distilling said liquid body in the presence of gaseous chlorine to thereby convert said monochloride contaminant to sulfur dichloride and removing a sulfur dichloride overhead and substantially sulfur free carbon tetrachloride bottoms, and subsequently distilling said carbon tetrachloride bottoms to provide a carbon tetrachloride overhead free of solid contaminants.

2. The method of claim 1 wherein the contaminated carbon tetrachloride liquid body being distilled is subjected to the action of ultraviolet light.

3. The method of claim 1 wherein the temperature of said chlorination zone is maintained below 76° C.

4. A process for recovering substantially pure carbon tetrachloride from a carbon tetrachloride-sulfur dichloride-sulfur monochloride mixture containing at least 90 percent carbon tetrachloride comprising distilling said mixture in a zone operated at a temperature and pressure sufficient to provide a sulfur monochloride bottoms and a carbon tetrachloride overhead, removing carbon tetrachloride overhead from said zone, adding a metal chloride chlorination catalyst thereto in quantities of below about 0.5 percent by weight, admitting chlorine to said carbon tetrachloride-catalyst mixture while distilling said carbon tetrachloride-catalyst mixture to provide a sulfur dichloride overhead and a carbon tetrachloride-catalyst mixture bottoms, interrupting the admission of chlorine to said carbon tetrachloride-catalyst mixture during distillation when the overhead product no longer contains sulfur dichloride, subsequently distilling the carbon tetrachloride-catalyst mixture bottoms to provide a carbon tetrachloride overhead and a chlorination catalyst containing bottoms product.

5. The method of claim 4 wherein the temperature of said chlorination zone is maintained below 55° C.

6. The method of claim 4 wherein said carbon tetrachloride being distilled in the presence of chlorine is subjected to the action of ultraviolet light during distillation.

7. The process of claim 4 wherein the temperature of said chlorination zone is maintained below 76° C.

References Cited by the Examiner

UNITED STATES PATENTS

| | | | |
|---|---|---|---|
| 1,817,123 | 8/1931 | Brallier et al. | 260—664 |
| 2,945,796 | 7/1960 | Saller | 260—652 |

LEON ZITVER, *Primary Examiner.*